US012765511B2

(12) United States Patent
Salyer et al.

(10) Patent No.: US 12,765,511 B2
(45) Date of Patent: Oct. 20, 2026

(54) TREAT DISPENSING TOY

(71) Applicant: The Kyjen Company, LLC, Centennial, CO (US)

(72) Inventors: Danielle Salyer, Denver, CO (US); Jeffrey Paris, Los Angeles, CA (US); Lynn Rosen, Parker, CO (US); Amanda Benham, Centennial, CO (US)

(73) Assignee: The Kyjen Company, LLC, Centennial, CO (US)

( * ) Notice: Subject to any disclaimer, the term of this patent is extended or adjusted under 35 U.S.C. 154(b) by 0 days.

(21) Appl. No.: 18/924,877

(22) Filed: Oct. 23, 2024

(65) Prior Publication Data

US 2026/0107919 A1 Apr. 23, 2026

(51) Int. Cl.
*A01K 5/01* (2006.01)
*A01K 15/02* (2006.01)

(52) U.S. Cl.
CPC .......... *A01K 5/0114* (2013.01); *A01K 15/025* (2013.01)

(58) Field of Classification Search
CPC ............................ A01K 5/0114; A01K 15/025
See application file for complete search history.

(56) References Cited

U.S. PATENT DOCUMENTS 1,190,028 A * 7/1916 Smith .................. A01K 5/0241 119/53.5
5,908,007 A * 6/1999 Duin ........................ A01K 5/01 119/51.11
5,957,082 A 9/1999 Budman
7,634,974 B1 * 12/2009 Puckett ................ A01K 39/014 119/74
D814,714 S 4/2018 Simon et al.
10,609,898 B2 4/2020 Simon et al.
D1,001,396 S 10/2023 Wu
2006/0000418 A1 1/2006 Kubala
2009/0001663 A1 * 1/2009 Franco Munoz ....... G07F 17/32 273/144 A
2013/0019812 A1 1/2013 Rutherford
2013/0139756 A1 6/2013 Miebach
2015/0161839 A1 6/2015 Franco Muoz
2015/0273319 A1 10/2015 Franco Munoz
(Continued)

FOREIGN PATENT DOCUMENTS

GB 2598766 A 3/2022
KR 20190074448 A 6/2019
(Continued)

OTHER PUBLICATIONS

Ito Rocky Store, Interactive Dog & Cat Food Puzzle Toy, Nov. 9, 2018, Amazon; https://www.amazon.com/ UInteractive-Dog-Cat-Food- Puzzle/dp/B07 KCJ H8 N6/ref=asc_df_B07 KCJ H8 N6/?tag=hyprod-20&linkCode=df0&hvadid=692875362841 &hvpos= &hvnetw=g&hvrand= 15055725283925840111 (Year: 2018).

*Primary Examiner* — Ebony E Evans
(74) *Attorney, Agent, or Firm* — Lempia Summerfield Katz LLC

(57) ABSTRACT

A pet toy includes a base including a bowl, a pair of columns extending from the base, a dispenser rotatably coupled to the pair of columns, the dispenser including a reservoir configured to store food and at least one opening configured to dispense to food as the dispenser rotates. The bowl is configured to catch and hold food dispensed from the dispenser.

14 Claims, 15 Drawing Sheets

(56) References Cited

U.S. PATENT DOCUMENTS

| | | | |
|---|---|---|---|
| 2018/0146640 | A1 | 5/2018 | Davis |
| 2019/0059319 | A1 | 2/2019 | Hsiao |
| 2023/0389515 | A1 | 12/2023 | Sumitsuji |
| 2024/0397908 | A1 | 12/2024 | Wilson et al. |

FOREIGN PATENT DOCUMENTS

| | | | |
|---|---|---|---|
| KR | 102153610 | B1 | 9/2020 |
| WO | 2021121072 | A1 | 6/2021 |

* cited by examiner

TREAT DISPENSING TOY

BACKGROUND OF THE DISCLOSURE

Field of the Disclosure

The disclosure relates generally to pet toys, and more specifically, to interactive pet toys configured to dispense food for pets.

Brief Description of Related Technology

Generally, a wide variety of pet toys are available to keep pets entertained. For example, pet toys include chew toys which are typically comprised of durable materials such as rubber or nylon and are designed to withstand heavy chewing. Other pet toys include squeaky toys, designed to make noise entertaining pets; balls and frisbees, designed to entertain pets while encouraging exercise; plush toys; and the like. Some pet toys engage and entertain pets by dispensing treats. However, after time, pets may become disinterested in their toys.

Accordingly, there is a need for new and unique pet toys that provide an interactive and dynamic playing experience, mentally stimulating pets, improving their overall health and behavior, and engaging pets for longer periods of time.

SUMMARY OF THE DISCLOSURE

In accordance with one aspect of the present disclosure, a pet toy includes a base including a bowl, a pair of columns extending from the base, and a dispenser rotatably coupled to the pair of columns, the dispenser including a reservoir configured to store food and at least one opening configured to dispense the food as the dispenser rotates. The bowl is configured to catch and hold food dispensed from the dispenser.

In accordance with another aspect of the present disclosure, a pet toy includes a base, a pair of columns extending from the base, and a dispenser rotatably coupled to the pair of columns, the dispenser including a reservoir configured to store food and at least one opening configured to dispense the food as the dispenser rotates.

In accordance with yet another aspect of the present disclosure, a pet toy includes a base including one or more fasteners configured to couple the pet toy to another item, a pair of columns extending from the base, and a dispenser rotatably coupled to the pair of columns, the dispenser including a reservoir configured to store food and at least one opening configured to dispense food as the dispenser rotates.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
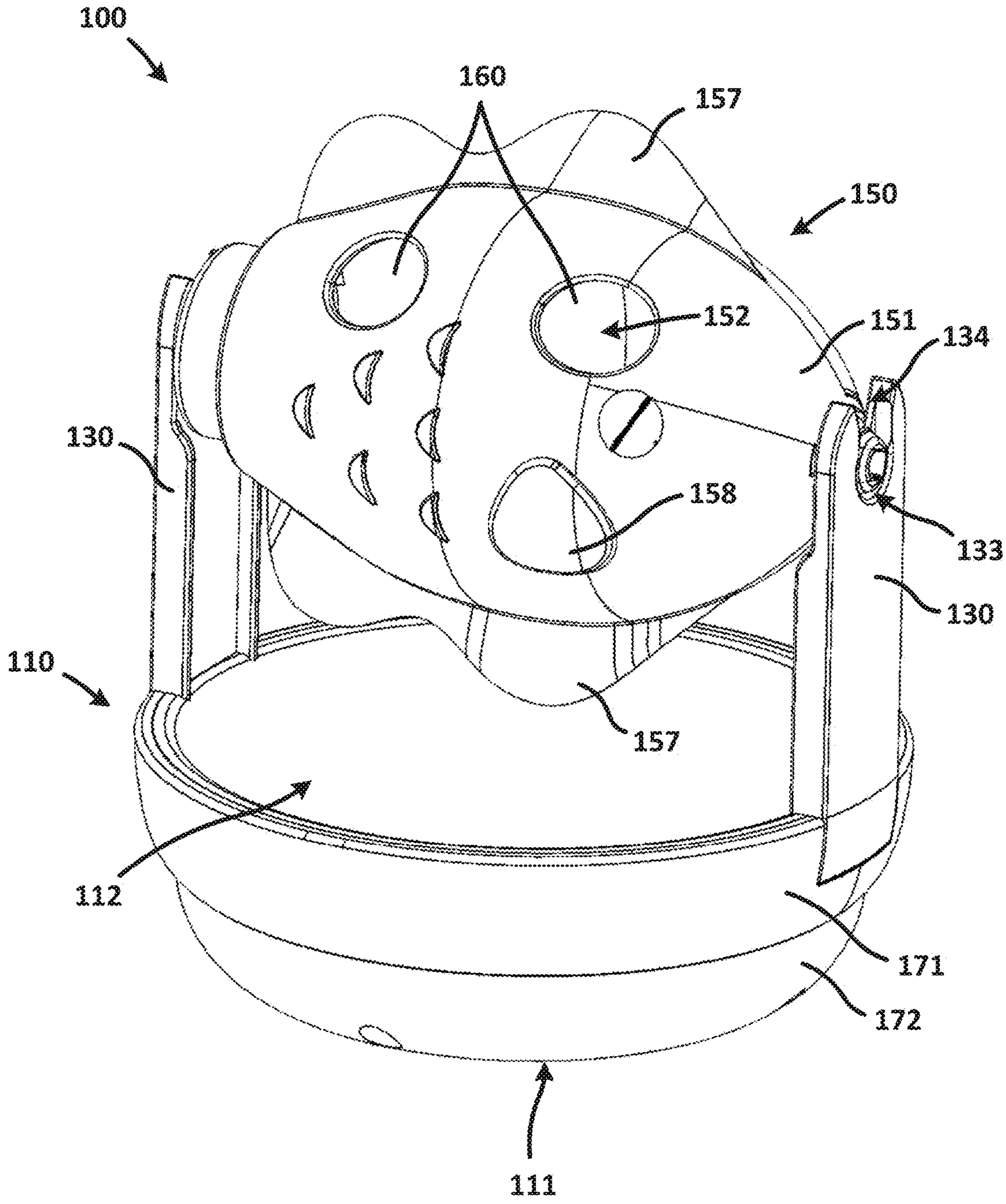
FIG. 1 illustrates a perspective view of a pet toy in accordance with one example of the present disclosure.

While the disclosed pet toys and methods are susceptible of embodiments in various forms, there are illustrated in the drawings (and will hereafter be described) specific embodiments of the disclosure, with the understanding that the disclosure is intended to be illustrative and is not intended to limit the disclosure to the specific embodiments described and illustrated herein.

DETAILED DESCRIPTION OF THE DISCLOSURE

The present disclosure is provided to solve the above-mentioned problems in the Background of the Disclosure section. Specifically, the present disclosure provides a pet toy that entertains and mentally stimulates pets by providing a puzzle to be solved that rewards pets with food or treats upon completion of the puzzle. As described herein, a pet toy includes a base and a dispenser rotatably coupled to the base. The dispenser may be configured to hold food (e.g., treats) for a pet and include one or more openings configured to dispense food as the dispenser is rotated. The pet toy presents pets with a puzzle or challenge as the dispenser must be rotated in order for food to be dispensed, thus becoming accessible to the pet.

Referring generally to the Figures, a pet toy according to the present disclosure may include a base, a pair of columns extending from the base, and a dispenser rotatably coupled to the pair of columns. The dispenser includes a reservoir configured to store food and one or more openings configured to dispense food as the dispenser rotates. The one or more openings may also be used, by a human, to fill the reservoir with food. According to some examples, the base may include a bowl configured to catch and hold food dispensed by the dispenser.

Provided herein are pet toys configured to entertain a pet while the pet attempts to get food stored in a reservoir of the dispenser.

Figure 2:
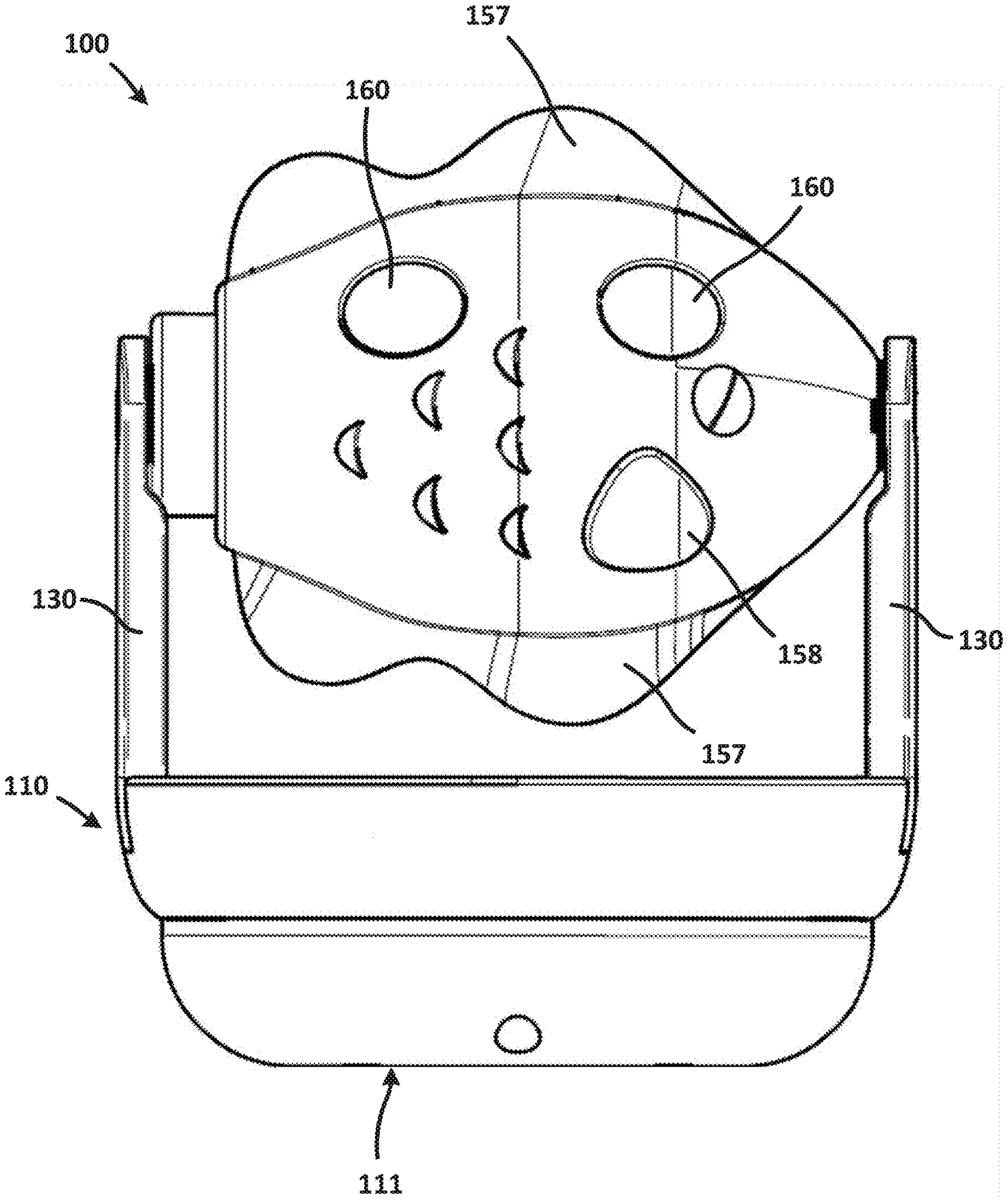
FIG. 2 illustrates a front view of the pet toy of FIG. 1 in accordance with one example of the present disclosure.

Referring generally to FIGS. 1 and 2, a pet toy 100 is illustrated in accordance with one example of the present disclosure. The relative dimensions shown in any of the figures are exemplary only, and other sizes and shapes may be used. The pet toy 100 may include a base 110, a pair of columns 130, and a dispenser 150.

According to some examples, the base 110 of the pet toy 100 may have a rounded shape including one or more stacked spherical segments. For example, as shown in FIGS. 1 and 2, the base 110 may have a rounded shape including two stacked spherical segments 171, 172. A bottom spherical segment 172 may be smaller than a top spherical segment 171. The base 110 may be configured to support the pair of columns 130 and the dispenser 150.

According to some examples, the base 110 of the pet toy 100 may be placed on a floor or another surface on which a pet may play with the toy 100. In these examples, the base 110 may include a planar bottom surface 111 configured to contact a supporting surface (e.g., a floor, table, or the like) on which the pet toy 100 rests. According to some examples, one or more feet configured to provide stability and/or prevent the base 110 from moving (e.g., sliding) relative to a surface on which the base 110 is disposed or resting may be coupled to the planar bottom surface 111 of the base 110. For example, the one or more feet may be composed of rubber, silicone, or another similar material.

As shown in FIG. 1, the base 110 may include a basin or bowl 112 configured to receive or catch and hold food dispensed from the dispenser 150 (e.g., as the dispenser 150 rotates). A top surface of the base 110 may define the bowl 112 configured to catch and store food dispensed by the dispenser 150. The bowl 112 may be disposed or located below the dispenser 150 such that food dispensed from the dispenser 150 falls into the bowl 112. For example, the bowl 112 may be disposed or located below one or more openings 160 included in the dispenser 150. The bowl 112 may hold the dispensed food so that it may be consumed by a pet (e.g., a cat, a dog).

According to other examples, the base 110 may not include a basin or bowl 112. For example, the base 110 may include a convex top surface, such that food dispensed by the dispenser 150 falls onto the convex top surface and slides down and off of the convex surface on to the ground (e.g., a floor) where the food may be consumed by a pet. According to other examples, the base 110 may have a planar top surface.

Still referring to FIGS. 1 and 2, the pair of columns 130 extend (i.e., upwardly and away) from the base 110. In some examples, the pair of columns 130 may be coupled to the base 110. For example, one or more fasteners (e.g., screws, bolts, rivets, and the like), an adhesive or glue, plastic welding, and the like, or any combination thereof may be used to couple the pair of columns 130 and the base 110. According to some examples, the pair of columns 130 may be removably coupled to the base 110. For example, the pair of columns 130 and the base 110 may have a press fit, friction fit, or other interference fit connection. The pair of columns 130 may also be snap fit into the base 110. According to other examples, the pair of columns 130 may be integrally formed with the base 110.

As shown in FIGS. 1 and 2, the pair of columns 130 may extend from opposite sides of the base 110. As shown, the pair of columns 130 may extend vertically from the base 110. The columns 130 may be configured to support the dispenser 150 above the base 110 of the pet toy 100. The dispenser 150 may be rotatably coupled to the pair of columns 130, so as to be free to rotate relative to the pair of columns 130 and the base 110 of the pet toy 100. According to some examples, the dispenser 150 may be coupled to a distal end of the pair of columns 130 opposite the base 110 of the pet toy 100. According to other examples, the dispenser 150 may be rotatably coupled to the pair of columns 130 at a mid-point of the pair of columns 130. The dispenser 150 may be coupled to the pair of columns 130 at any point along the length of the pair of columns 130. According to some examples, the dispenser 150 may be rotatably coupled to the pair of columns 130 a sufficient distance away from the base 110, such that, the dispenser 150 may make a complete rotation (360 degrees) without contacting the base 110 of the pet toy 100. According to some examples, the pair of columns 130 may be non-adjustable, such that the dispenser 150 may only be coupled to the pair of columns 130 at a single fixed height above the base 110 of the pet toy 100. In other words, according to some examples, a position of the dispenser 150 relative to the base 110 may not be changed by adjusting a height or position of the pair of columns 130. According to other examples, a height or position of the pair of columns 130 relative to the base 110 may be adjusted, allowing a user to set or change a height at which the dispenser 150 is disposed above the base 110. For example, the pair or columns 130 may telescope into or out of the base 110 or another component, allowing a user to adjust a height or position of the pair of columns 130, and thus a height or position of the dispenser 150 over the base 110. Each of the pair of columns 130 may include a receptacle 133 configured to receive a portion of the dispenser 150, for rotatably coupling the dispenser 150 to the pair of columns 130, as will be described in more detail below.

The dispenser 150 is rotatably coupled to the pair of columns 130. The dispenser 150 may include an exterior shell or panel 151 and a container, compartment or reservoir 152. The panel 151 may define the size and shape of an exterior surface of the dispenser 150 and the reservoir 152 disposed within the dispenser 150. The reservoir 152 may be configured to hold or store food (e.g., pet food). For example, the reservoir 152 may be configured to store kibble or treats for a pet. Food stored in the reservoir 152 may be dispensed as the dispenser 150 rotates. Specifically, as the dispenser 150 rotates, food stored in the reservoir 152 may be dispensed through one or more openings 160 extending through the outer shell or panel 151 of the dispenser 150.

As shown, the dispenser 150 may be rotatably disposed or located between the pair of columns 130. According to some examples, the dispenser 150 may be shaped to represent an object or an animal. For example, the dispenser 150 may include a housing or panel 151 having a shape corresponding to the object or animal represented. In some examples, as shown, the dispenser 150 may be shaped like a fish. The dispenser 150 may have the shape of any item, object, or living thing.

Figure 3:
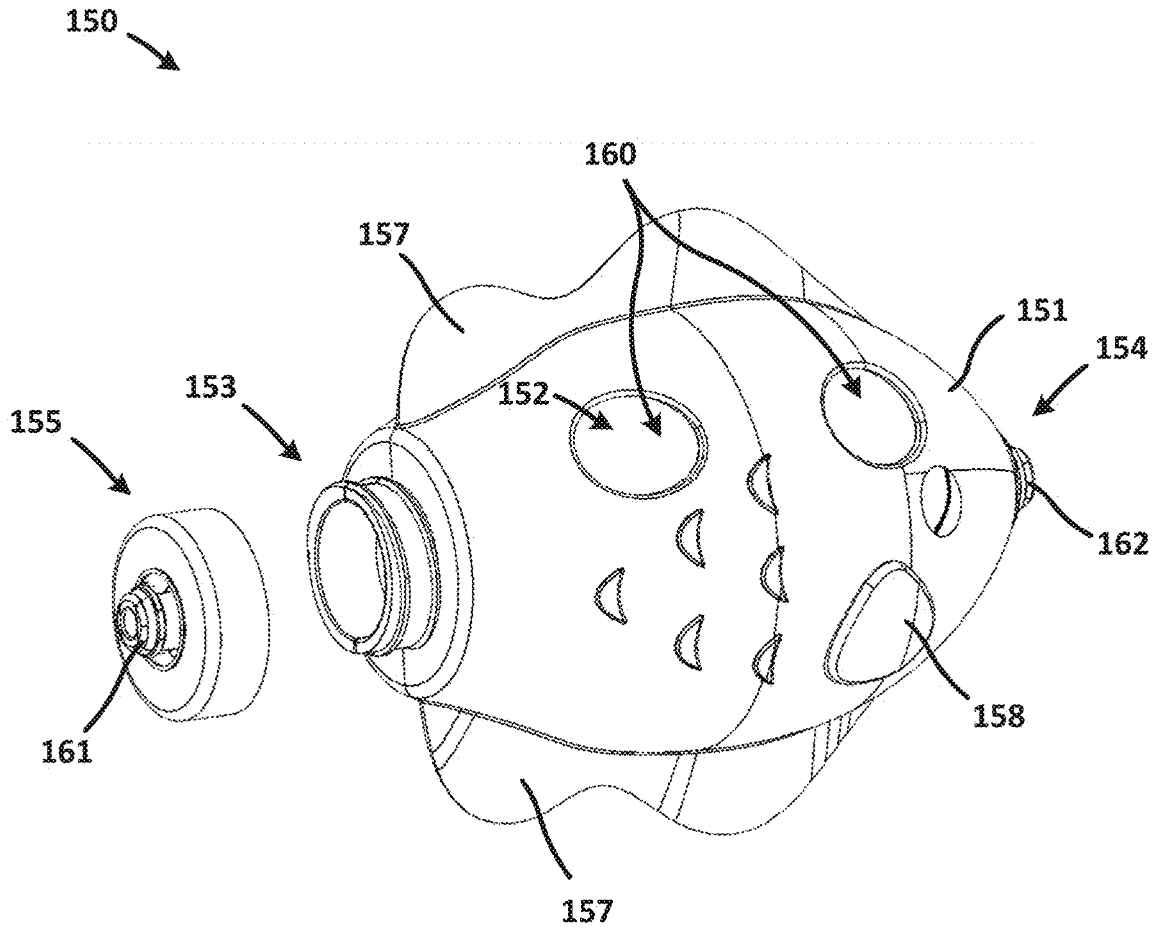
FIG. 3 illustrates an exploded view of a dispenser in accordance with one example of the present disclosure.

Referring to FIG. 3, an exploded view of the dispenser 150 is illustrated in accordance with one example of the present disclosure. As shown in FIG. 3, the dispenser 150 has an open end 153 and a closed end 154. The open end 153 and the closed end 154 may be opposite ends of the dispenser 150. The open end 153 is in communication with the container, compartment or reservoir 152 of the dispenser 150, such that the reservoir 152 is accessible via the open end 153. The open end 153 may allow, for example, filling, emptying, and/or cleaning of reservoir 152. The dispenser 150 also includes a cover or cap 155 (e.g., end cap) configured to be removably coupled to the open end 153 of the dispenser 150. The cap 155 is configured to mechanically lock or otherwise engage with the open end 153. According to some examples, as shown in FIG. 3, the open end 153 of the dispenser 150 may include screw threads and corresponding grooves (e.g., internal and external threads) to allow the cap 155 to be screwed on to the open end 153. Other types of coupling mechanisms are possible, such as clasps, snaps, magnets, and/or other mechanical locking devices. According to some examples, an interference fit connection, such as, a press or snap fit connection may be used to couple the cap 155 to the open end 153.

Referring generally to FIGS. 1-3, an exterior surface of the dispenser 150 may include one or more ribs, fins, or ridges 157 and/or one or more knobs or protuberances 158 that allow a pet to engage the dispenser 150 more easily, for example, with their paws or mouth to manipulate or rotate the dispenser 150. According to some examples, the one or more ridges 157 may have a shape corresponding to a body part or portion of an animal or object represented by the dispenser 150. For example, as shown, the one or more ridges 157 may correspond to fins when the dispenser 150 is shaped to represent a fish. The dispenser 150 further includes one or more openings 160 extending through the panel 151 of the dispenser 150 to allow the food inside the dispenser 150 to be dispensed when the dispenser 150 is rotated.

As shown in FIG. 3, a first protrusion 161 may be included on an exterior surface of the cap 155 and a second protrusion 162 may be included on an exterior surface of the dispenser 150 at the closed end 154 of the dispenser 150. The first protrusion 161 and the second protrusion 162 are configured to fit into corresponding receptacles 133 in the pair of columns 130 (see FIG. 1). The receptacles 133 are configured to mechanically lock the dispenser 150 to the pair of columns 130 in a rotatable fashion.

As shown in FIGS. 1-3, the first protrusion 161 and the second protrusion 162 are small cylindrically shaped protrusions extending away from the exterior surface of the cap 155 and the panel 151 of the dispenser 150, respectively. The receptacles 133 are sized and shaped to correspond to the size and shape of the first protrusion 161 and the second protrusion 162. As shown in FIG. 1, the receptacles 133 are semi-circular shaped cutouts or depressions in the pair of columns 130 designed to receive the first protrusion 161 and the second protrusion 162, respectively.

According to some examples, the dispenser 150 may be removably coupled to the pair of columns 130. For example, the first protrusion 161 and the second protrusion 162 may be press fit or snap fit through a mouth 134 and into the receptacle 133 of a respective one of the pair of columns 130. The first protrusion 161 and the second protrusion 162 may be free to rotate within their respective receptacles 133. According to some examples, the first protrusion 161 and the second protrusion 162 may be withdrawn or removed from their respective receptacles 133 by exerting a separating force exceeding a predetermined threshold on the dispenser 150 and/or base 110 and columns 130 of the pet toy 100. According to other examples, one or more snaps, threads, magnets, or combinations thereof may be used to couple the first protrusion 161 and the second protrusion 162 to receptacles 133 in their respective columns 130. Other attachment means are possible.

Figure 4:
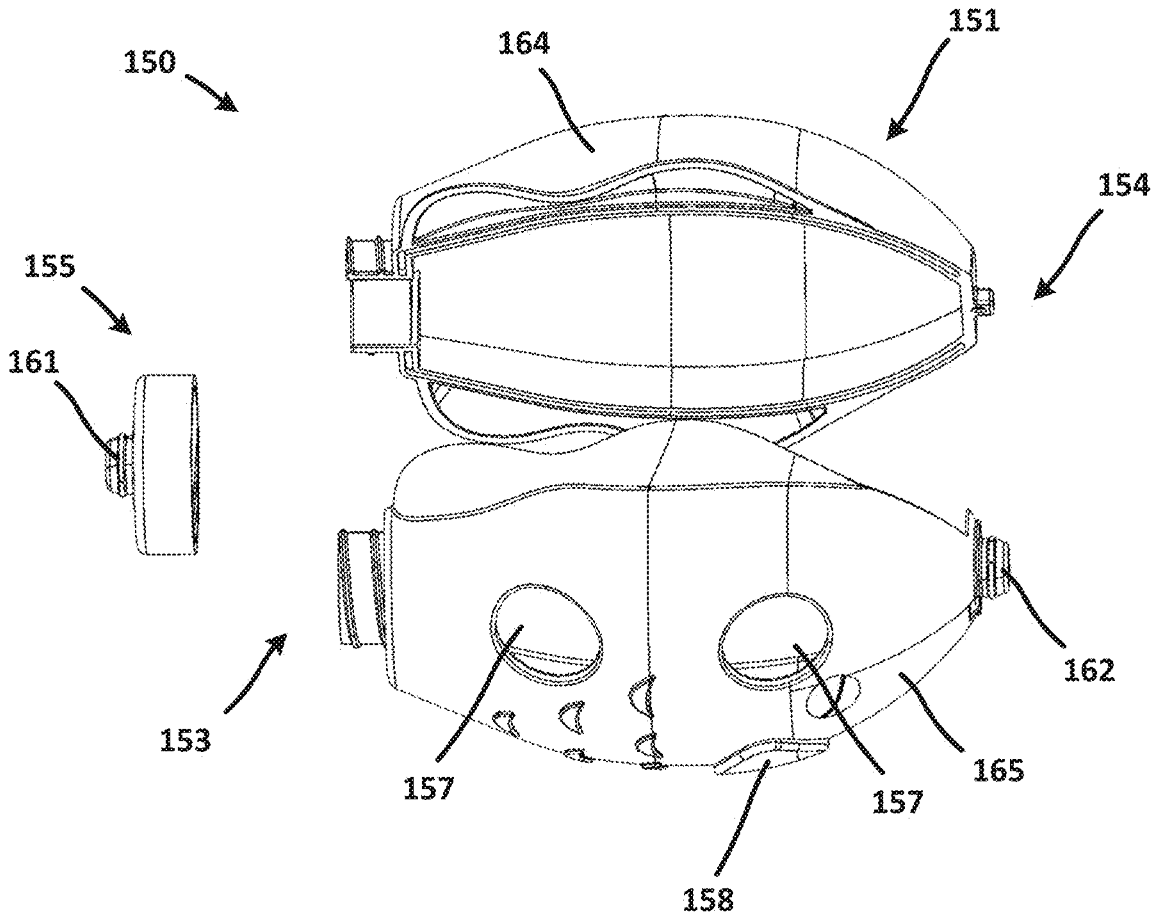
FIG. 4 illustrates another exploded view of a dispenser in accordance with one example of the present disclosure.

Referring to FIG. 4, another exploded view of the dispenser 150 is illustrated in accordance with an example of the present disclosure. According to some examples, as shown in FIG. 4, the dispenser 150 may have two halves. For example, the housing or panel 151 defining an exterior surface and reservoir 152 of the dispenser 150 may include a first half 164 and a second half 165. The two halves 164, 165 of the dispenser 150 can be separated to allow for easier cleaning. However, in another example, the dispenser 150, specifically, the panel 151 of the dispenser 150, may be one integral piece.

As noted above, the dispenser 150 includes one or more openings 160 extending through the panel 151. According to the present disclosure, food may travel from the reservoir 152, through an opening 160, and to an exterior of the dispenser 150, when the dispenser 150 is rotated. According to some examples, food dispensed from the dispenser 150 may fall into a bowl 112 included in the base 110. According to some examples, as shown in FIGS. 1-4, the dispenser 150 includes two circular shaped openings 160 adjacent to one another on the same side, for example, extending through the same half (e.g., 164, 165) of the panel 151, of the dispenser 150. However, the present disclosure is not limited thereto and the shape, size, number, and placement of the plurality of openings 160 may vary. The size, shape, number, and placement of openings 160 affect the manner in which the food or treats inside the reservoir 152 are dispensed. For instance, having one small opening extending through the panel 151 allows less food to be dispensed, making it more difficult for a pet to receive the food from the dispenser 150, while having many, large openings extending though the panel 151 allows the food to be dispensed more rapidly.

Figure 6:
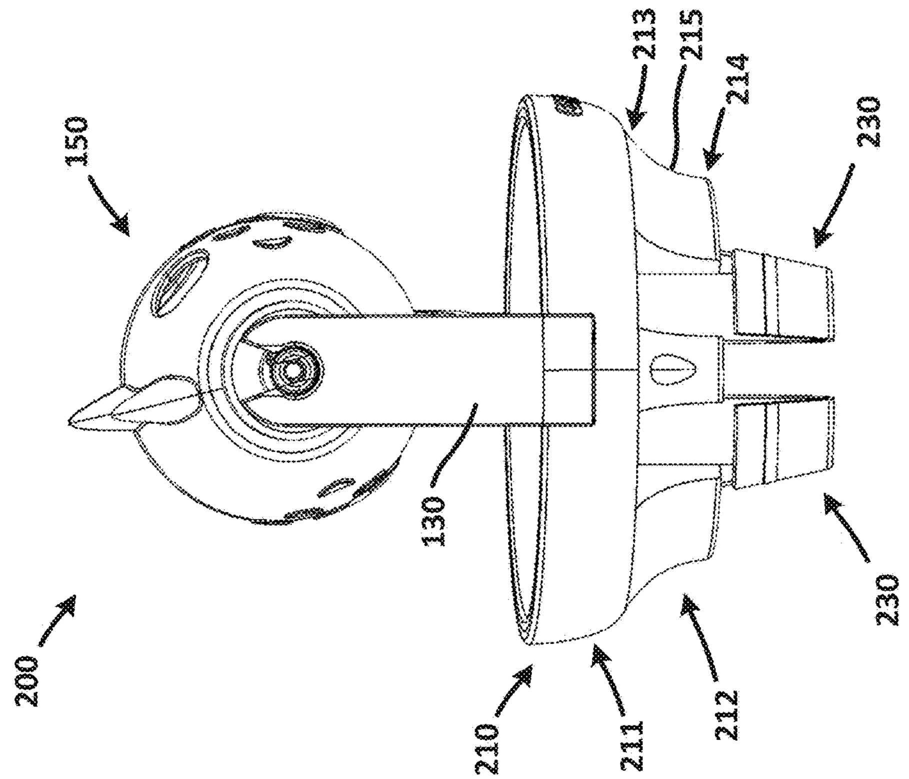
FIG. 6 illustrates a side view of the pet toy of FIG. 5 in accordance with one example of the present disclosure.
Figure 5:
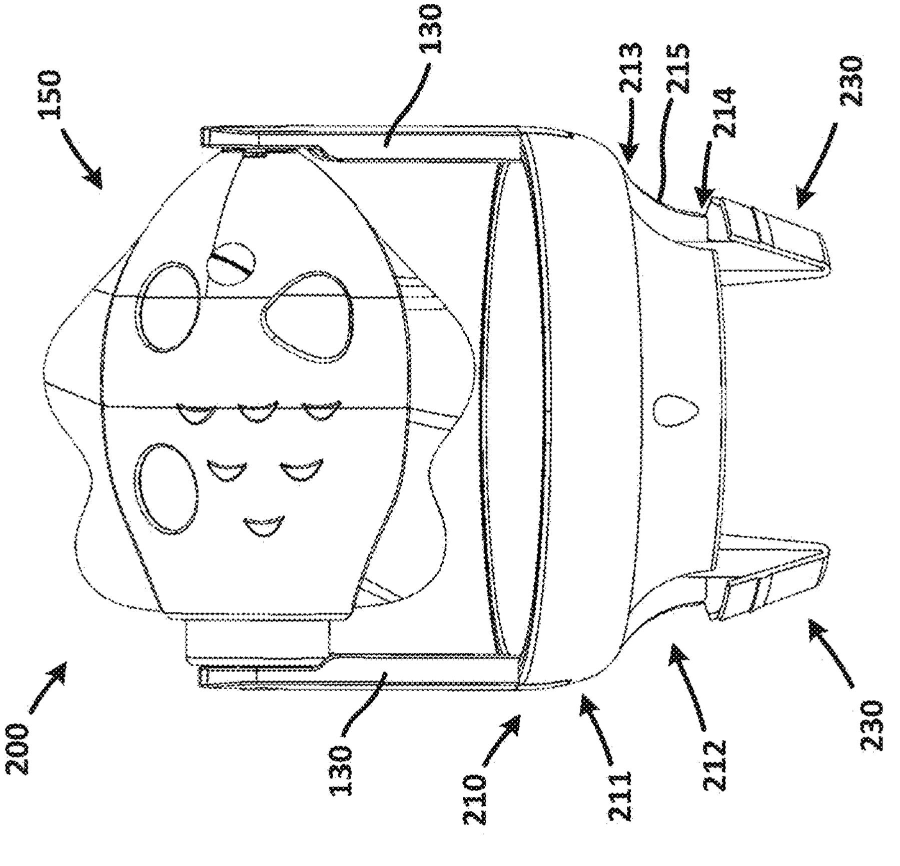
FIG. 5 illustrates a front view of a pet toy in accordance with one example of the present disclosure.

Referring to FIGS. 5 and 6, a pet toy 200 is illustrated in accordance with another example of the present disclosure. The pet toy 200 is substantially similar to the pet toy 100 described above with respect to FIGS. 1-4, except the pet toy 200 includes an interchangeable base 210 and one or more fasteners 230 instead of the base 110 described above. The interchangeable base 210 is designed to be able to connect to other toys or products by way of the one or more fasteners 230. For example, the interchangeable base 210 may be configured to fit or nest within a stand or a top of another toy, such as a tower of tracks or a FIG. 8 track type toy. According to other examples, the interchangeable base 210 may fit within or attach to other toys or products. The interchangeable base 210 may allow the pet toy 200 to be removable coupled to another toy or product as a detachable/re-attachable toy or accessory for the other toy or product.

Still referring to FIGS. 5 and 6, the interchangeable base 210 includes a top portion 211 and a bottom portion 212. Instead of extending from the base 110, the pair of columns 130 included in the pet toy 200 may extend from the top portion 211 of the interchangeable base 210. The top portion 211 of the interchangeable base 210 may include a basin or bowl, substantially similar to the bowl 112 included in base 110 described above, which is configured catch and hold food dispensed by the dispenser 150.

The bottom portion 212 of the interchangeable base 210 may fit or nest within, or otherwise couple to, an item, such as another toy or pet product. In this regard, the bottom portion 212 may be sized and shaped to correspond to an opening or area of the pet toy or product into which the bottom portion 212 may be inserted, such as an opening in the top of another toy. According to one example, as shown in FIGS. 5 and 6, the bottom portion 212 of the interchangeable base 210 has a top end 213 and a bottom end 214. An outer sidewall 215 of the bottom portion 212 of the interchangeable base 210 tapers down from the top end 213 to the bottom end 214. As shown in FIGS. 5 and 6, the top end 213 and the bottom end 214 of the bottom portion 212 of the interchangeable base 210 may be circular shaped, such that a singular side wall 215 wraps around the perimeter of the bottom portion 212. However, other shapes are possible. The size, shape, and configuration of the bottom portion 212 of the interchangeable base 210, and specifically the top end

213, bottom end 214, and sidewall(s) 215, are designed to correspond to an opening of an item, such as another toy or product, as shown below.

The pet toy 200 may further include a plurality of fasteners 230 extending from the bottom portion 212 of the interchangeable base 210 configured to engage with an opening portion of an object, such as a lip portion of the item. According to some examples, the one or more fasteners 230 may be snap fit fasteners, where a portion of the fasteners 230 is compliant and flexible, such that when the fasteners 230 are pressed downward to engage with a lip portion of the item, the fastener 230 bends/flexes allowing the bottom portion 212 of the base 210 to be inserted into an opening of the item, but once the fasteners 230 pass the lip portion, the compliant portion snaps back to its original position and prevents the interchangeable base 210 from being lifted or removed from the item. To release or remove the interchangeable base 210, the compliant portion of the fasteners 230 are pressed inwardly, thus allowing the fasteners 230 to disengage from the lip portion and be lifted out of the opening portion of the item. The configuration described above offers a large degree of flexibility and modularity, since it allows the pet toy 200 to "snap" into circular openings of different sizes. This flexibility may also account for dimensional variability.

Other types of fasteners 230 may be used to allow the interchangeable base 210 to be interchangeable and modular with other items or products. In one example, threads may be used, such that the interchangeable base 210 can be screwed into an opening of an item or product. In other examples, the interchangeable base 210 may simply be sized and shaped to allow the bottom portion 212 of the interchangeable base 210 to nest within an opening of an item or product. Similarly, the bottom portion 212 of the interchangeable base 210 may be interference or press fit within an opening of the item or product (e.g., by pressing the bottom portion 212 of the interchangeable base 210 into the opening of the item).

Figure 15:
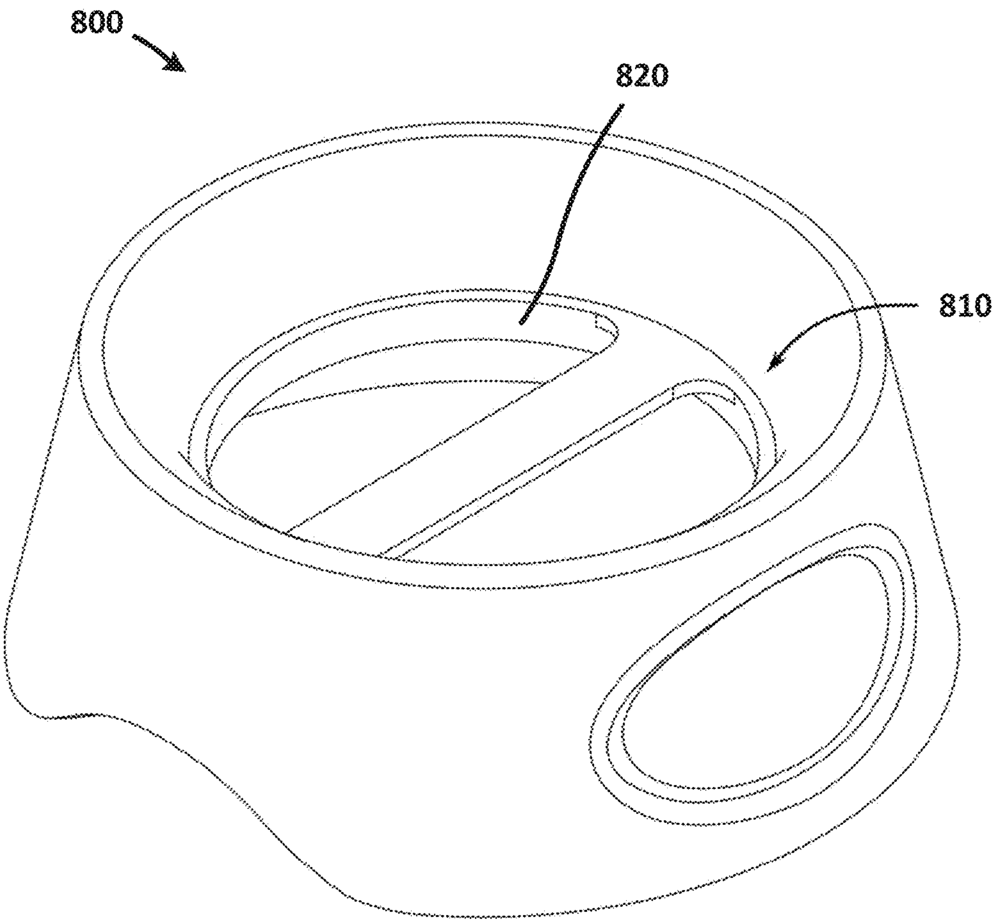
FIG. 15 illustrates a base or stand in accordance with one example of the present disclosure.

Referring to FIG. 15, a base or stand 800 to which the pet toy 200 may be coupled is illustrated in accordance with one example of the present disclosure. As shown the stand 800 includes an opening portion 810. According to the present disclosure, the bottom portion 212 of the interchangeable base 210 may be configured to fit or nest within the opening portion 810 of the stand 800. As shown in FIG. 15, the stand 800 may further include a lip portion 820 disposed in the opening portion 810 of the stand 800. According to the present disclosure, the fasteners 230 of the pet toy 200 may be configured to engage the lip portion 820 of the stand 800. Specifically, as described above, the fasteners 230 may be pressed downward toward the lip portion 820 causing the fasteners 230 to bend or flex allowing the bottom portion 212 of the interchangeable base 210 to be inserted into the opening portion 810 of the stand 800. After the fasteners 230 pass the lip portion 820, a compliant portion of the fasteners 230 may return to their original positions and prevent the interchangeable base 210 from being lifted or removed from the stand 800. To release or remove the interchangeable base 210, the compliant portion of the fasteners 230 may be pressed inwardly, thus allowing the fasteners 230 to disengage from the lip portion 820 and be lifted out of the opening portion 810 of the stand 800.

Figure 16:
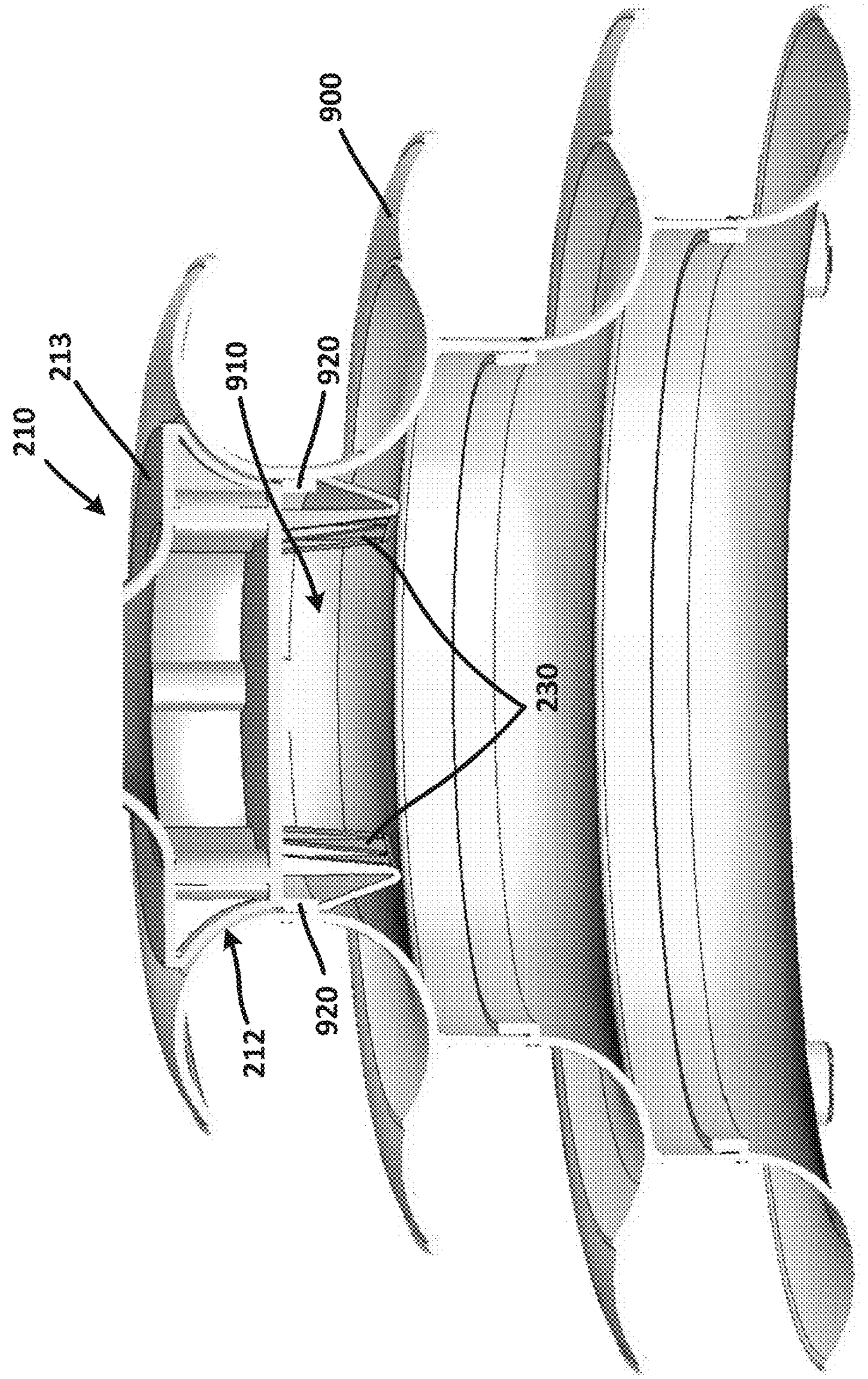
FIG. 16 illustrates an interchangeable base of a pet toy in a state of being coupled to a pet product in accordance with one example of the present disclosure.

Referring to FIG. 16, a partial cross-section view of the pet toy 200 in a state of being coupled to a pet product 900 is illustrated in accordance with an example of the present disclosure. As shown in FIG. 16, the pet product may be a toy or game having multiple tracks stacked in a tower configuration. A ball or other playing thing may be disposed in the tracks to entice a pet to play with the pet product 900.

As shown in FIG. 16, the interchangeable base 210 is illustrated in a state of being coupled to the pet product 900. Specifically, as shown in FIG. 16, the bottom portion 212 of the interchangeable base 210 is disposed or positioned within an opening portion 910 of the pet product 900. Further, as shown, the fasteners 230 of the pet toy 200 are in a state of being engaged with a lip portion 920 disposed in the opening portion 910 of the pet product 900. The interchangeable base 210 may be coupled to and separated from (e.g., de-coupled) from the pet product 900 the same way that the interchangeable base 210 is coupled to or separated from the stand 800 as described above with respect to FIG. 15.

Figure 17:
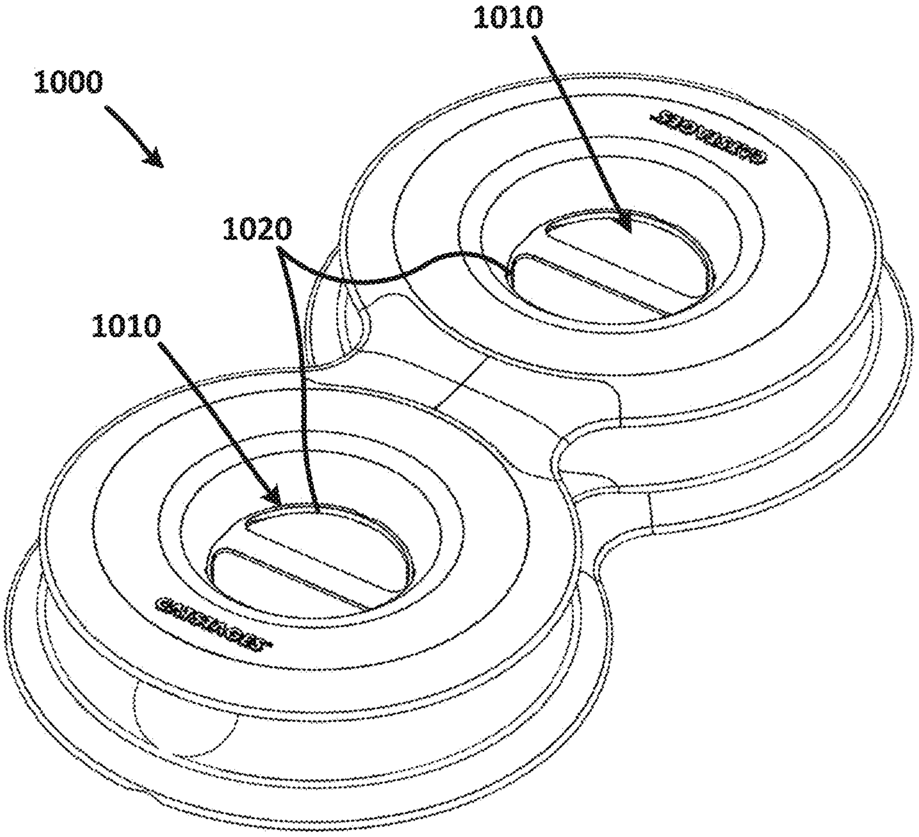
FIG. 17 illustrates a pet product in accordance with one example of the present disclosure.

Referring to FIG. 17, a pet product 1000 is illustrated in accordance with another example of the present disclosure. The pet product 1000 may be a pair of connected circular tracks in a "figure 8" configuration or shape having an opening portion 1010 in the middle of each circular track. The opening portion 1010 may be the same as the opening portions 810 and 910 described above with respect to FIGS. 15 and 16, such that the fasteners 230 of the interchangeable base 210 are configured to engage or couple with the opening portion 1010 of the pet product 1000, such as a lip portion 1020 similar to or the same as the lip portions 820 and 920 described above with respect to FIGS. 15 and 16.

Figure 7:
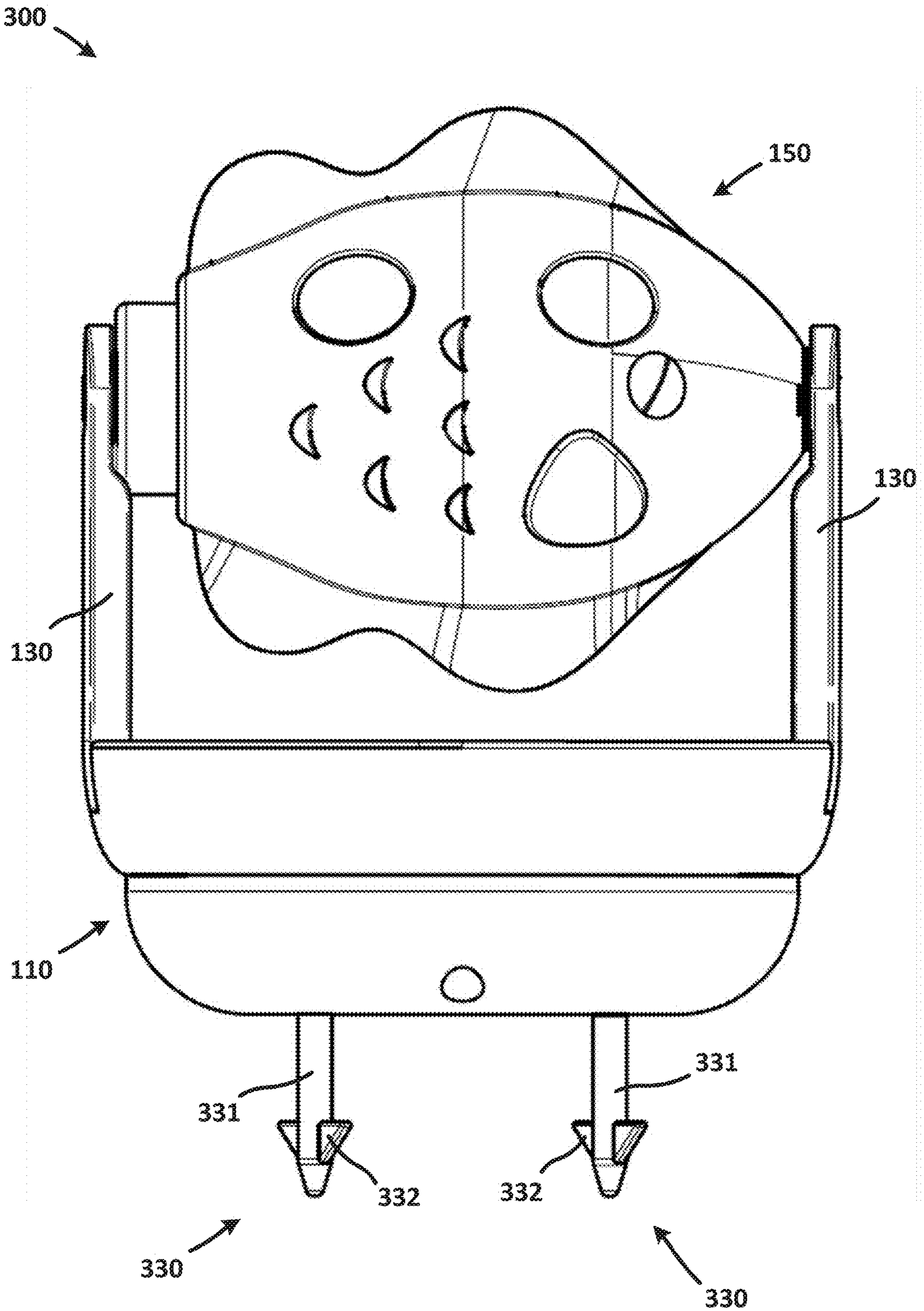
FIG. 7 illustrates a front view of a pet toy in accordance with one example of the present disclosure.

Referring back to FIG. 7, a pet toy 300 is illustrated in accordance with another example of the present disclosure. The pet toy 300 is substantially similar to the pet toy 100 described above with respect to FIGS. 1-4, except the base 110 of the pet toy 300 includes two fasteners 330 in the form of pointed shafts or rods 331 with barbs 332 protruding from the pointed end of the rods 331. The fasteners 330 may be configured to allow the pet toy 300 to be coupled to a product made of corrugated cardboard, such as a scratch pad for a cat. In one example, the barbs 332 are triangular shaped. In this way, the fasteners 330 are similar to spikes or arrows that, when pushed into a product made of corrugated cardboard, for example, penetrate the corrugated cardboard and resist being pulled out because of the barbs 332. Other types of barbed rods or stems may be used to couple the pet toy 300 to another pet toy or product comprised of a material such as corrugated cardboard that resist being pulled out due to the barbs or protrusions along the shaft or rod 331.

Figure 8:
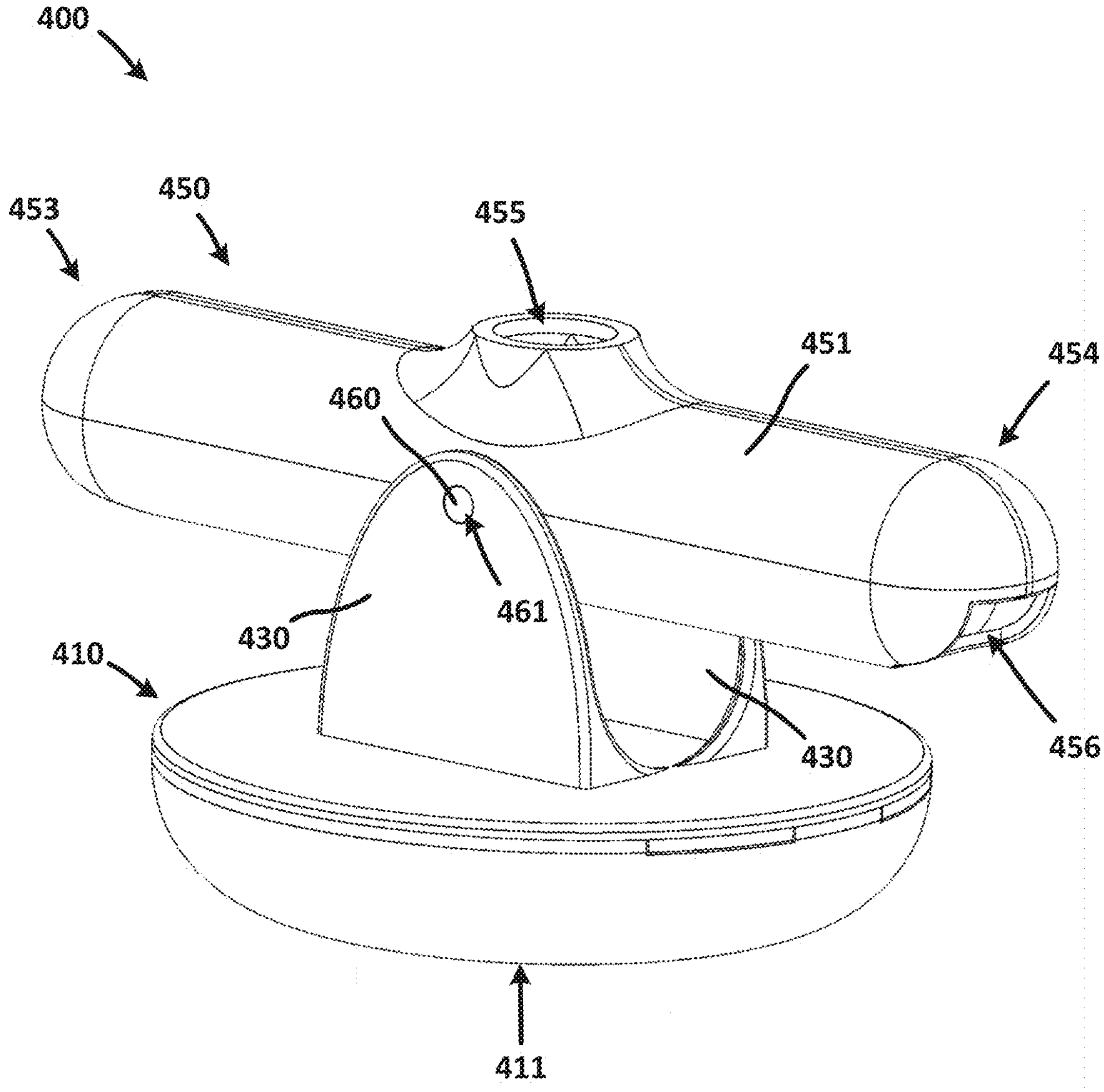
FIG. 8 illustrates a perspective view of a pet toy in accordance with one example of the present disclosure.
Figure 9:
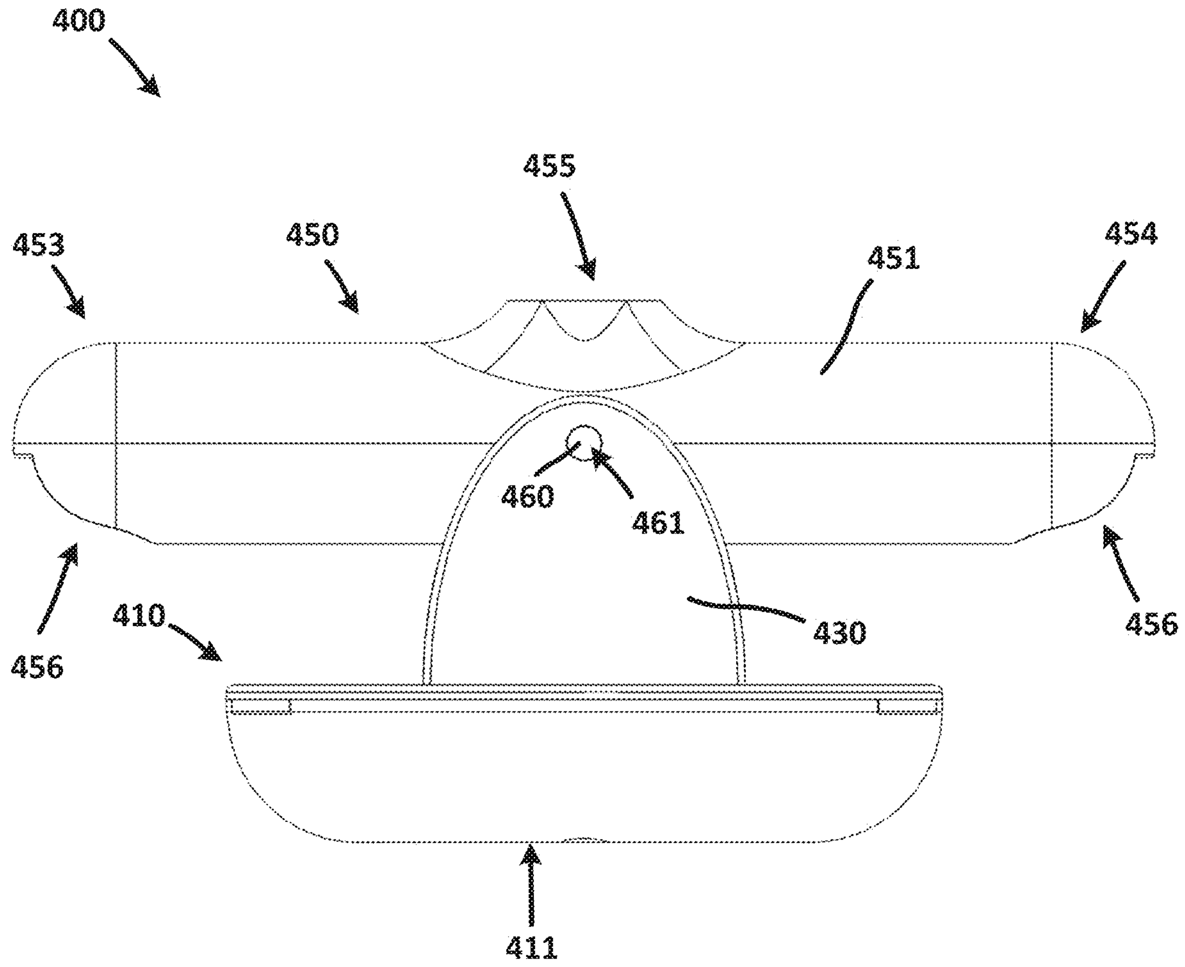
FIG. 9 illustrates a side view of the pet toy of FIG. 8 in accordance with one example of the present disclosure.
Figure 10:
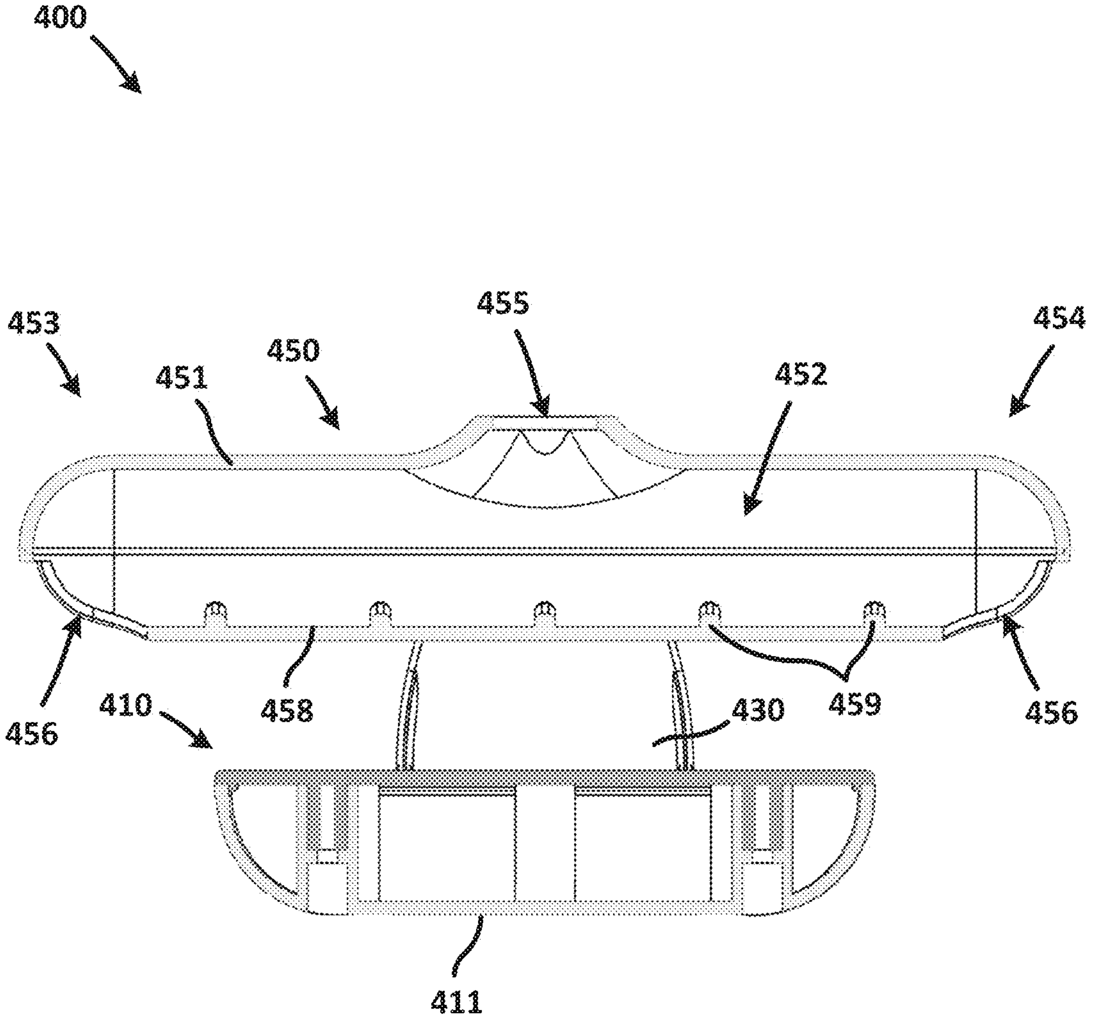
FIG. 10 illustrates a side cross-sectional view of the pet toy of FIG. 8 in accordance with one example of the present disclosure.

Referring generally to FIGS. 8-10, a pet toy 400 is illustrated in accordance with another example of the present disclosure. The relative dimensions shown in any of the figures are exemplary only, and other sizes and shapes may be used. The pet toy 400 may include a base 410, a pair of columns 430, and a dispenser 450. According to some examples, as shown in FIGS. 8-10, the base 410 may have the shape of a spherical segment. The base 410 may be configured to support the pair of columns 430 and the dispenser 450.

According to some examples, the base 410 of the pet toy 400 may be placed on a floor or another surface on which a pet may play with the toy 400. In these examples, the base 410 may include a planar bottom surface 411 configured to contact a supporting surface (e.g., a floor, table, or the like) on which the pet toy 400 rests. According to some examples, one or more feet configured to provide stability and/or prevent the base 410 from moving (e.g., sliding) relative to a surface on which the base 410 is disposed or placed may be coupled to the planar bottom surface 411 of the base 410.

For example, the one or more feet may be composed of rubber, silicone, or another similar material.

As shown, the pet toy 400 further includes a pair of columns 430 extending (i.e., upwardly and away) from the base 410 of the pet toy 400. According to some examples, as shown in FIG. 8, the pair of columns 430 may have an arcuate or parabolic shape. The pair of columns 430 are configured to support a dispenser 450 above the base 410 of the pet toy 400. For example, the pair of columns 430 may be configured to support a dispenser 450 rotatably disposed between the pair of columns 430.

In some examples, the pair of columns 430 may be coupled to the base 410. For example, one or more fasteners (e.g., screws, bolts, rivets, and the like), an adhesive or glue, plastic welding, and the like, or any combination thereof may be used to couple the pair of columns 430 and the base 410. According to some examples, the pair of columns 430 may be removably coupled to the base 410. For example, the pair of columns 430 and the base 410 may have a press fit, friction fit, or other interference fit connection. The pair of columns 430 may also be snap fit into the base 410. According to other examples, the pair of columns 430 may be integrally formed with the base 410.

As shown the pair of columns 430 may extend from opposite halves of the base 410 and be disposed parallel to one another so as to face one another. As shown, the columns 430 may extend vertically from the base 410. The dispenser 450 may be rotatably coupled to the pair of columns 430, so as to be free to rotate relative to the pair of columns 430 and the base 410 of the pet toy 400. As shown, the dispenser 450 may be coupled to the pair of columns 430 at or near a distal end of the columns 430, opposite the base 410. According to other examples, the dispenser 450 may be coupled to the pair of columns 430 at or near a midpoint of the pair of columns 430. The dispenser 450 may be coupled to the pair of columns 430 at any point along the length of the pair of columns 430. As shown, each of the pair of columns 430 may include a socket 461 configured to receive a portion of the dispenser 450, for rotatably coupling the dispenser 450 to the pair of columns 430, as will be described in more detail below.

The dispenser 450 may be rotatably coupled to the pair of columns 430. The dispenser 450 may include an exterior shell or panel 451 and a container, compartment or reservoir 452. The panel 451 may define a size and shape of an exterior surface of the dispenser 450 and the reservoir 452 disposed within the dispenser 450 (e.g., disposed within the panel 451 of the dispenser 450). The reservoir 452 may be configured to hold or store food (e.g., pet food). For example, the reservoir 452 may be configured to store kibble or treats for a pet. Food stored in the reservoir 452 may be dispensed as the dispenser 450 rotates.

According to some examples, the dispenser 450 may have a cylindrical shape including round ends. Specifically, the dispenser 450 may include a rounded first end 453 and a rounded second end 454. As shown, in some examples, the dispenser 450 may extended beyond (e.g., a perimeter of) the base 410. However, the present disclosure is not limited thereto and the dispenser 450 may have any size and/or shape.

As shown in FIGS. 8-10, the dispenser 450 may further include an inlet 455 and one or more outlets or openings 456. The inlet 455 may extend through the panel 451 of the dispenser 450 at a top of the dispenser 450. Specifically, the inlet 455 may be disposed or located above the reservoir 452 of the dispenser 450. The inlet 455 may be in communication with the reservoir 452, such that food (e.g., treats, kibble) for a pet may be provided to the reservoir 452 through the inlet 455. For example, a human may supply pet food to the reservoir 452 through the inlet 455.

Still referring to FIGS. 8-10, the dispenser 450 may further include one or more outlets or openings 456 configured to dispense food as the dispenser 450 is rotated. As shown, the dispenser 450 may include two outlets or openings 456. For example, the dispenser 450 may include an outlet or opening 456 disposed or located at each of the first end 453 and the second end 454 of the dispenser 450. As shown, the outlets or openings 456 may extend through the panel 451 of the dispenser 450 at a bottom of the dispenser 450. Specifically, the outlets or openings 456 may be disposed below the reservoir 452 of the dispenser 450.

Referring to FIGS. 8 and 9, an exterior surface of the dispenser 450 may include a pin 460 extending from each of opposite sides of the dispenser 450. The pins 460 are configured to fit into corresponding sockets 461 in the pair of columns 430. The sockets 461 are configured to mechanically lock the dispenser 450 to the pair of columns 430 in a rotatable fashion. As shown in FIGS. 8 and 9, the pins 460 are small cylindrically shaped protrusions extending away from the exterior surface of the dispenser 150. The sockets 461 are sized and shaped to correspond to the size and shape of the pins 460. As shown in FIGS. 8 and 9, the sockets 461 are circular shaped cutouts or depressions in the pair of columns 430 designed to receive the pins 460.

The outlets or openings 456 may be configured to dispense food as the dispenser 450 rotates. Specifically, the dispenser 450 may be configured to rotate or "teeter totter" back and forth such that one end (453, 454) of the dispenser 450 is elevated and the other opposite end (453,454) is lowered. According to some examples, as shown in FIG. 10, the reservoir 452 may include a substantially planar bottom surface 458. Accordingly, when the dispenser 450 is moved such that one end (453, 454) is elevated, for example, relative to the other opposite end (453, 454) of the dispenser 450, which is lowered, food, such as treats or kibble, may roll, slide, or tumble, under the effects of gravity, along the bottom surface 458 of the reservoir 452 toward the lowered end (e.g., 453, 454) of the dispenser 450. After reaching a lowered end (e.g., 453, 454) of the dispenser 450, the food may travel through an outlet or opening 456 disposed at the lowered end (e.g., 453, 454) of the dispenser 450 and out of the dispenser 450, for example, onto the floor or another surface proximate to the pet toy 400 for consumption by a pet.

In some examples, as shown in FIG. 10, one or more ridges 459 may extend from the bottom surface 458 of the reservoir 452. The one or more ridges 459 may be configured to engage or interfere with food (e.g., kibble) disposed in the reservoir 452, as the food travels from an elevated end (e.g., 453, 454) of the dispenser 450 toward a lowered end (e.g., 453, 454) of the dispenser 450. According to some examples, the one or more ridges 459 may cause the food to tumble, as opposed to slide, along the bottom surface 458 of the reservoir 452 toward the lowered end of the dispenser 450. According to some examples, the one or more ridges 459 may be configured to catch some of the food or kibble traveling toward a lowered end of the dispenser 450, making it more difficult for a pet to obtain food disposed in the reservoir 452 and thus extending the period of time during which the pet must engage with the pet toy 400 to obtain all of the food disposed in the reservoir 452.

According to some examples, the base 410 of the pet toy may abut or contact the dispenser 450 when an end (453, 454) of the dispenser 450 reaches a lower most position, preventing further rotation of the dispenser 450 (e.g., in a direction which would further lower the end disposed in the lower most position). Accordingly, when one end (453, 454) of the dispenser 450 is in a lower most position, the dispenser 450 may only be rotated in a direction in which the end, disposed in the lower most position, is raised or elevated.

Accordingly, the dispenser 450 may be configured to be moved (e.g., rotated) back and forth by a pet, such that the first end 453 and the second end 454 alternate between the elevated and lowered positions. As the dispenser 450 rotates back and forth, food may be dispensed from the outlet or opening 456 disposed at an end (453, 454) of the dispenser 450 in the lowered position. For example, a portion of the food disposed in the reservoir 452 may be dispensed from the opening 456 of a lowered end of the dispenser 450, with each alternating motion of the dispenser 450.

Figure 12:
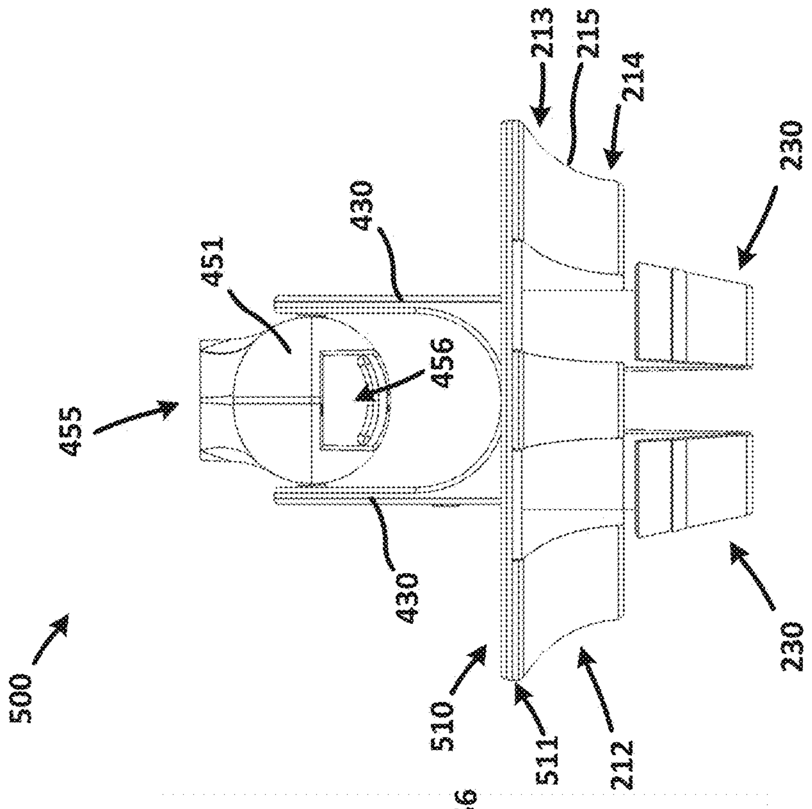
FIG. 12 illustrates a front view of the pet toy of FIG. 11 in accordance with one example of the present disclosure.
Figure 11:
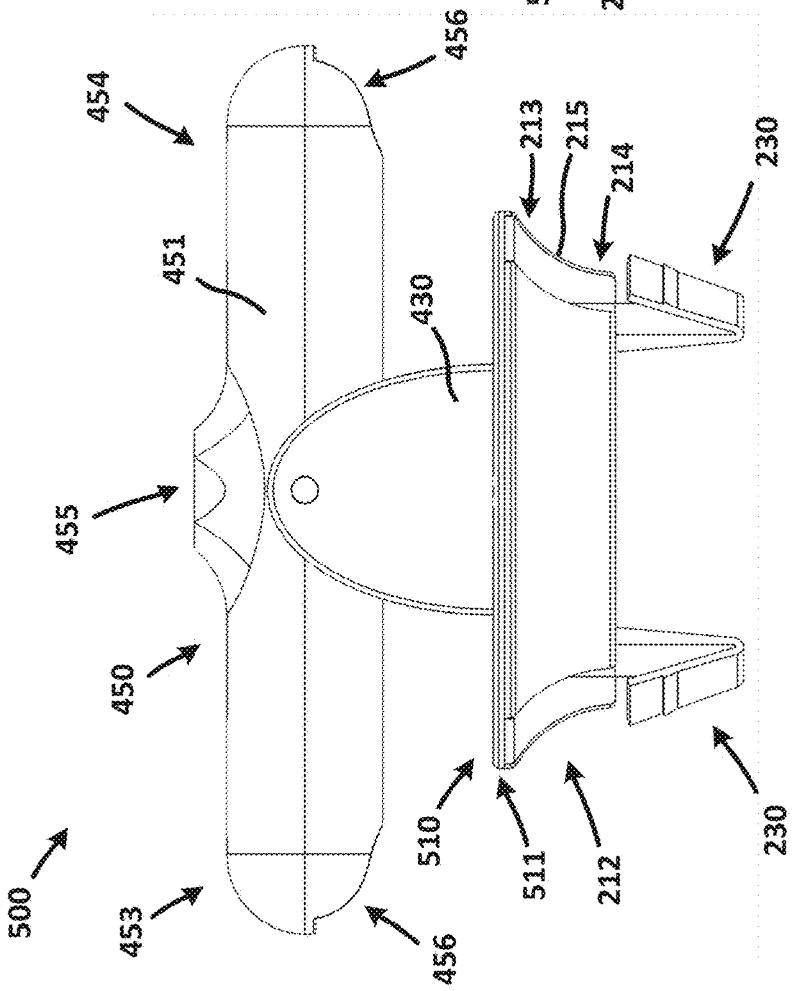
FIG. 11 illustrates a side view of a pet toy in accordance with one example of the present disclosure.

Referring to FIGS. 11 and 12, a pet toy 500 is illustrated in accordance with another example of the present disclosure. The pet toy 500 is substantially similar to the pet toy 400 described above with respect to FIGS. 8-10, except the pet toy 500 includes an interchangeable base 510 and one or more fasteners 230 instead of the base 410 described above. The interchangeable base 510 is designed to be able to connect to other toys or products by way of the one or more fasteners 230. For example, the interchangeable base 510 may be configured to fit or nest within a stand or a top of another toy, such as a tower of tracks or a FIG. 8 track type toy. According to other examples, the interchangeable base 510 may fit within or attach to other toys or products. The interchangeable base 510 may allow the pet toy 500 to be removably coupled to another toy or product as a detachable/re-attachable toy or accessory for the other toy or product.

Still referring to FIGS. 11 and 12, the interchangeable base 510 includes a top portion 511 and a bottom portion 212. Instead of extending from the base 410 as described above, the pair of columns 430 included in the pet toy 500 may extend from the top portion 511 of the interchangeable base 510. The bottom portion 212 of the interchangeable base 510 may be the same as the bottom portion 212 of the interchangeable base 210 described above with respect to FIGS. 5 and 6. Specifically, the bottom portion 212 may be configured to fit or nest within, or otherwise couple to, an item, such as another pet toy or pet product. For example, the bottom portion 212 of the interchangeable base 510 may be coupled to any of the stand 800, the pet product 900, and the pet product 1000. The interchangeable base 510 of the pet toy 500 may be coupled to and/or separated from any of the stand 800, the pet product 900, and the pet product 1000 in the same manner as the interchangeable base 210 as described above with respect to FIGS. 5, 6, and 15-17.

Figure 13:
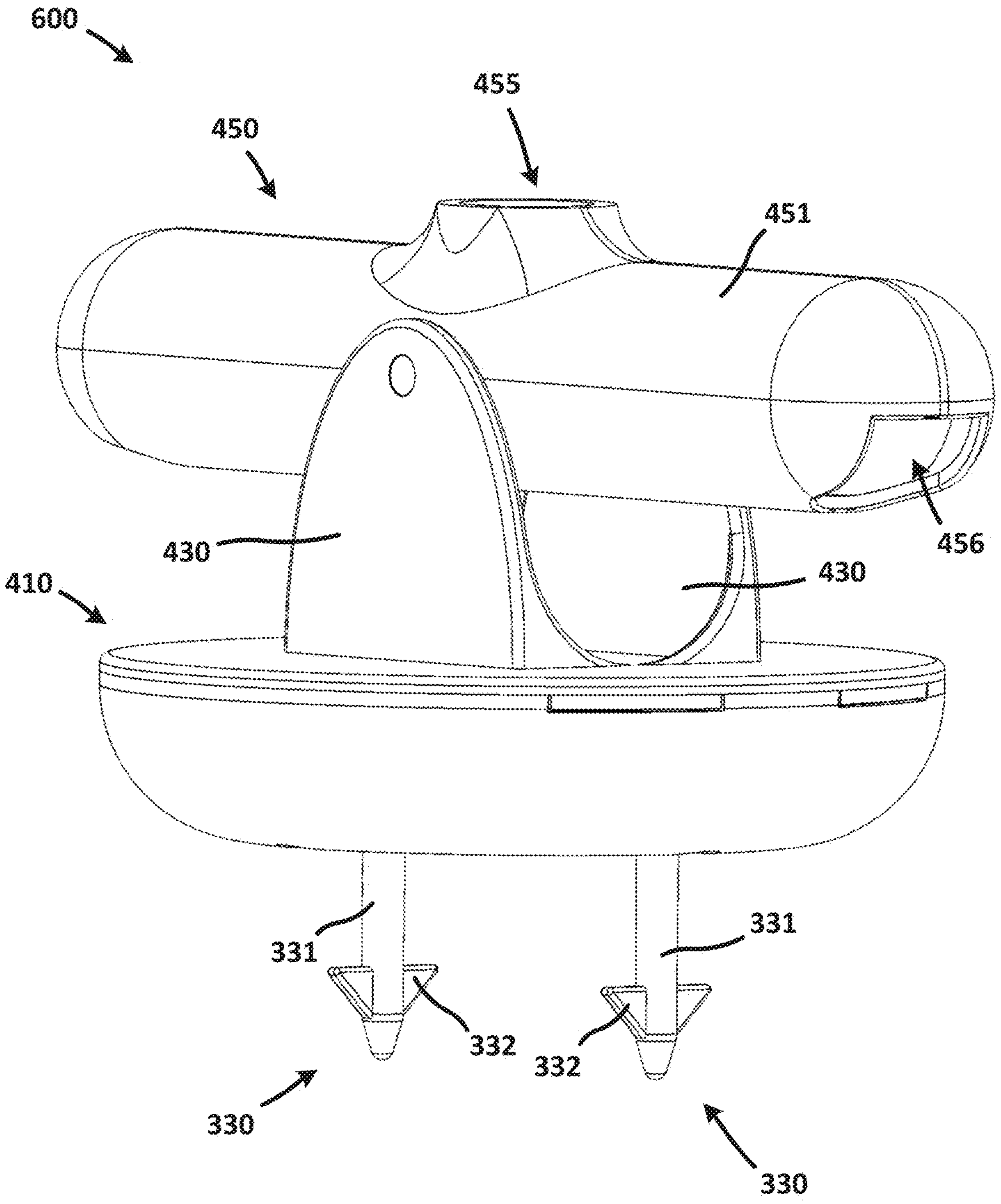
FIG. 13 illustrates a perspective view of a pet toy in accordance with one example of the present disclosure.

Referring to FIG. 13, a pet toy 600 is illustrated in accordance with another example of the present disclosure. The pet toy 600 is substantially similar to the pet toy 400 described above with respect to FIGS. 8-10, except the base 410 of the pet toy 600 includes two fasteners 330 in the form of pointed shafts or rods 331 with barbs 332 protruding from the pointed end of the rods 331. The fasteners 330 may be configured to allow the pet toy 600 to be coupled to a product made of corrugated cardboard, such as a scratch pad for a cat. In one example, the barbs 332 are triangular shaped. In this way, the fasteners 330 are similar to spikes or arrows that, when pushed into a product made of corrugated cardboard, for example, penetrate the corrugated cardboard and resist being pulled out because of the barbs 332. Other types of barbed rods or stems may be used to couple the pet toy 600 to another pet toy or product comprised of a material such as corrugated cardboard that resist being pulled out due to the barbs or protrusions along the rod or stem.

Figure 14:
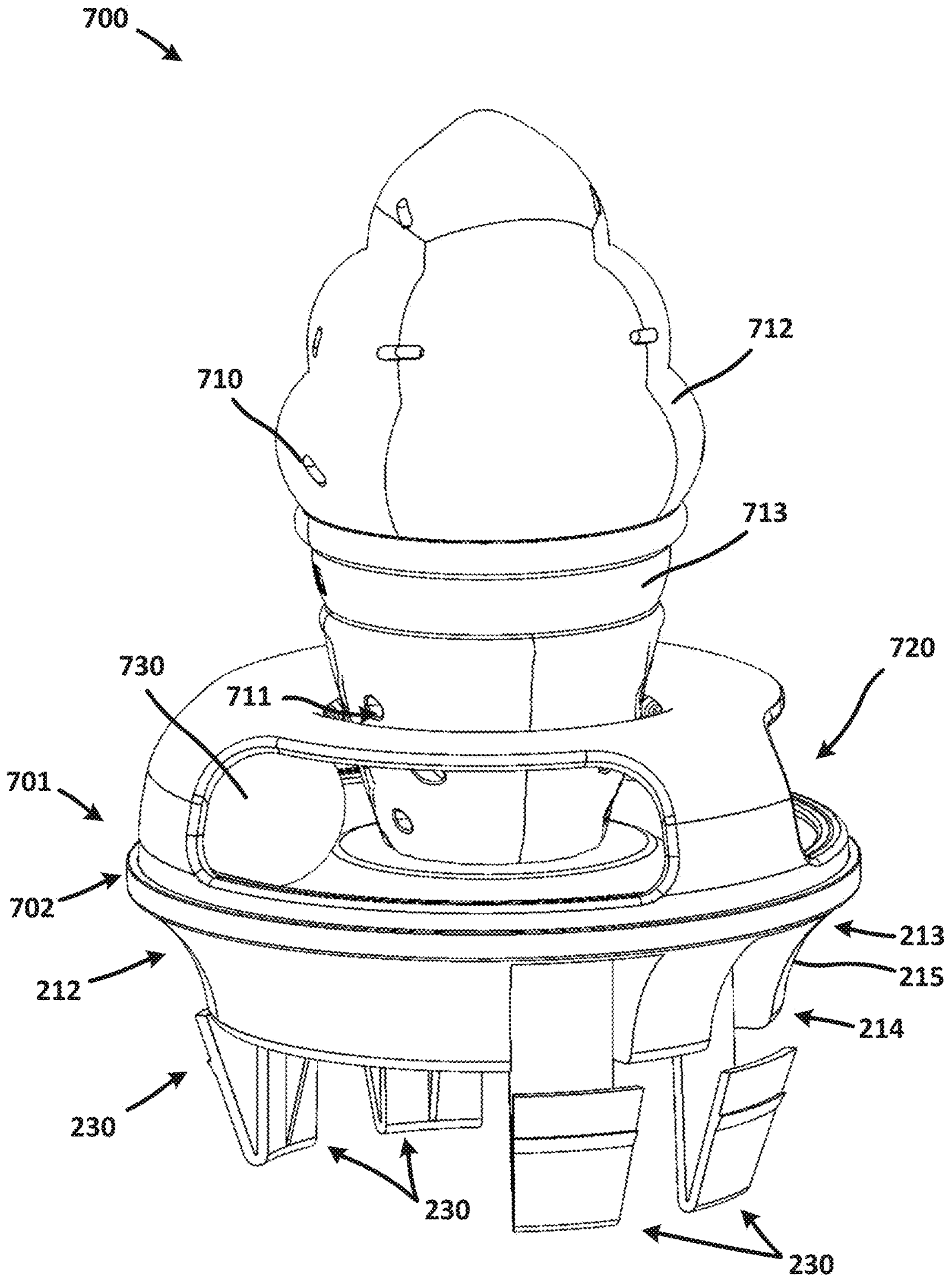
FIG. 14 illustrates a perspective view of a pet toy in accordance with one example of the present disclosure.

Referring to FIG. 14, a pet toy 700 is illustrated in accordance with another example of the present disclosure. As shown in FIG. 14, the pet toy 700 includes a container 710 configured to store a treat or attractant for a pet, such as catnip for a cat. As shown in FIG. 14, the container 710 may be shaped to represent an object or an animal. For example, the container 710 may include an outer surface having a shape corresponding to the object or animal represented. In some examples, as shown, the container 710 may be shaped like an ice cream cone. The container 710 may have the shape of any item, object, or living thing.

According to some examples, the container 710 may include an upper or first portion 712 and a bottom or second portion 713. According to some examples, the first portion 712 and the second portion 713 may be removably coupled to one another, so as to selectively provide access to an interior (e.g., reservoir) disposed in the container 710, for example, allowing a human to provide a treat or attractant (e.g. catnip) to, or remove a treat or attractant from, the container 710. According to some examples, the container 710 may be rotatably coupled to an interchangeable base 701 of the pet toy 700.

As shown in FIG. 14, the container 710 may include on or more openings 711. The one or more openings 711 may allow or improve the ability of a pet, for example, a cat, to smell catnip or another treat disposed in the container 710. The container 710 may be configured to store a treat, such as catnip, to entice a pet to play with the pet toy 700. According to some examples, the pet toy 700 may further include a track 720 and a ball 730 or another play thing confined to, and configured to move along, the track 720.

According to some examples, the pet toy 700 may include an interchangeable base 701 substantially similar to the interchangeable base 210 described above with respect to FIGS. 5 and 6. The interchangeable base 701 may include a top portion 702 including the track 720 and ball 730 and a bottom portion 212. The bottom portion 212 may be and function the same as the bottom portion 212 described above with respect to FIGS. 5-6. According to other examples, the base 701 may include a planar bottom surface configured to support the pet toy 700 when resting on a surface such as the ground, floor, or another planar surface. In some examples, the base 701 may include barbed fasteners, such as fasteners 330 described above, configured to couple the pet toy 700 to corrugated cardboard or another similar material.

It should be understood that, although the terms first, second, etc. may be used herein to describe various elements, components, regions, levels, layers, and/or sections, these elements, components, regions, levels, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

For clarity of disclosure, the terms "top," "upper," "bottom," and "lower" are defined herein relative to a position of the base 110, 210, 410, 510, 701 of the pet toy 100, 200, 300, 400, 500, 600, 700 resting on a horizontal surface, such as the ground or floor or coupled to another pet toy or product 800, 900, 1000 resting on a horizontal surface such as the ground or floor. The terms “top” and “upper” refer to the position of an element further away from the horizontal surface. The terms “bottom” and “lower” refer to the position of an element closer to the horizontal surface.

Spatially relative terms, such as “beneath,” “below,” “lower,” “under,” “above,” “upper,” and the like, may be used herein for ease of description to describe one element or feature’s relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as “below,” “beneath,” or “under,” other elements or features would then be oriented “above” the other elements or features. Thus, the example terms “below” and “under” may encompass both an orientation of above and below. The device may be otherwise oriented (rotated 90 degrees or at other orientations) and the spatially relative descriptors used herein interpreted accordingly. In addition, when an element is referred to as being “between” two elements, the element may be the only element between the two elements, or one or more other intervening elements may be present.

While the present disclosure has been described with reference to specific examples, which are intended to be illustrative only and not to be limiting of the disclosure, it should be apparent to those of ordinary skill in the art that changes, additions and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being “configured to” meet that purpose or perform that operation or function.

What is claimed is:

1. A pet toy, the pet toy comprising:
- a base including a bowl;
- a pair of columns including a first column and a second column extending from the base, the first column including a first receptacle and the second column including a second receptacle; and
- a dispenser rotatably coupled to the pair of columns, the dispenser including;
  - a reservoir configured to store food;
  - a closed end;
  - an open end opposite the closed end;
  - a cap coupled to the open end;
  - a first protrusion included on an exterior surface of the cap, the first protrusion disposed in the first receptacle;
  - a second protrusion included on an exterior surface of the closed end, the second protrusion disposed in the second receptacle; and
  - at least one opening configured to dispense the food as the dispenser rotates,
- wherein the bowl is configured to catch and hold the food dispensed from the dispenser.

2. The pet toy of claim 1, wherein an exterior surface of the dispenser includes at least one ridge.

3. The pet toy of claim 1, wherein the dispenser includes a plurality of openings configured to dispense the food as the dispenser rotates.

4. The pet toy of claim 1, wherein the dispenser includes a first half and a second half configured to be separated from one another.

5. The pet toy of claim 1, wherein the dispenser is removably coupled to the pair of columns.

6. The pet toy of claim 1, wherein the cap is threadedly coupled to the open end.

7. A pet toy, the pet toy comprising:
- a base;
- a pair of columns including a first column and a second column extending from the base, the first column including a first receptacle and the second column including a second receptacle; and
- a dispenser rotatably coupled to the pair of columns, the dispenser including:
  - a reservoir configured to store food;
  - a closed end;
  - an open end in communication with reservoir;
  - a cap rotatably coupled to the open end;
  - a first protrusion included on an exterior surface of the cap, the first protrusion rotatably disposed within the first receptacle;
  - a second protrusion included on an exterior surface of the closed end, the second protrusion rotatably disposed within the second receptacle; and
  - at least one opening configured to dispense the food as the dispenser rotates.

8. The pet toy of claim 7, further comprising:
- an inlet in communication with and disposed above the reservoir.

9. A pet toy comprising:
- a base including one or more fasteners configured to couple the pet toy to another item;
- a pair of columns including a first column and a second column extending from the base, the first column including a first receptacle and the second column including a second receptacle; and
- a dispenser rotatably coupled to the pair of columns, the dispenser including:
  - a reservoir configured to store food;
  - a closed end;
  - an open end opposite the closed end;
  - a cap coupled to the open end;
  - a first protrusion included on an exterior surface of the cap, the first protrusion disposed in the first receptacle;
  - a second protrusion included on an exterior surface of the closed end, the second protrusion disposed in the second receptacle; and
  - at least one opening configured to dispense the food as the dispenser rotates.

10. The pet toy of claim 9, wherein the dispenser is disposed entirely above the base.

11. The pet toy of claim 9, wherein the dispenser includes a plurality of openings configured to dispense the food as the dispenser rotates.

12. The pet toy of claim 9, wherein the dispenser includes a first half and a second half configured to be separated from one another.

13. The pet toy of claim 9, wherein the dispenser is configured to abut the base, preventing rotation of the dispenser in one direction.

14. The pet toy of claim 9, wherein the one or more fasteners each include a rod and a triangular shaped barb.

* * * * *